Oct. 5, 1965    A. E. CROWLEY ETAL    3,209,742
SAND TABLE OR OUTDOOR GRILL
Filed Sept. 26, 1963

INVENTORS.
ALLEN E. CROWLEY
DONALD E. BETTS

BY 3,209,742
SAND TABLE OR OUTDOOR GRILL
Allen E. Crowley, 2155 Waldemere St., and Donald E. Betts, Myakka River State Park, both of Sarasota, Fla.
Filed Sept. 26, 1963, Ser. No. 311,882
1 Claim. (Cl. 126—25)

This invention relates to a sand table structure for use as a grill or outdoor cooking stove.

An object of the present invention is to provide an outdoor grill or cooking table which is so constructed and designed that it will require practically no maintenance, will be long lasting, is easily cleaned and is relatively inexpensive to manufacture.

The outdoor grill of the present invention is particularly adaptable for use in parks, recreation centers, or analogous locations, especially where camping sites are provided, in that it provides a safe, readily accessible, and convenient arrangement to permit cooking food by the campers or picnickers, and eliminates liability of forest fire, such as is always present with camp fires, and also it may be easily, quickly and inexpensively cleaned.

The outdoor grill of the present invention is strong and sturdy in construction and of such construction that it may be firmly and securely installed, thereby reducing liability to breakage or destruction due to carelessness, accident or vandalism on the part of users or others.

While the sand table or outdoor grill is particularly adaptable for use in public parks, recreation centers, camping sites, etc., it is also adaptable for use in the yards of homes, and being in its major components practically indestructible will outlast many of the portable or stationary metal grills now in use and it is so designed as not to be unattractive in appearance, but rather to provide ornamentation to a yard.

With these and other objects in view, as may appear in the accompanying specification, the invention consists of the various features of construction and combination of parts, which will be first described in connection with the accompanying drawings, showing a sand table or outdoor grill of a preferred form embodying the invention, and the features forming the invention will be specifically pointed out in the claim.

Referring more particularly to the drawings, 1 indicates the main body of the sand table or grill which is made of concrete reinforced by suitable metal rods indicated at 2, placed in the concrete in such manner as to sturdily reinforce the concrete and the structure of the grill body.

The body 1 is substantially a hyperbolic paraboloid, consisting of the perpendicular supporting base or column 3 and the upwardly and outwardly tapering main body portion 4 formed integrally with the supporting column 3 by the moulding of the entire body 1 in a suitable mold when making the grill.

Figure 1:
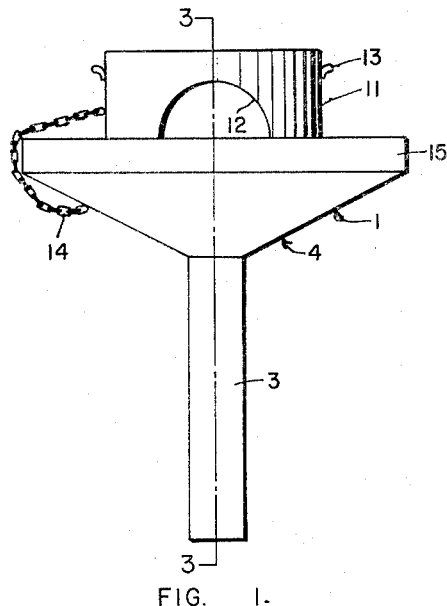
FIGURE 1 is a side elevation of the improved sand table or outdoor grill.
Figure 2:
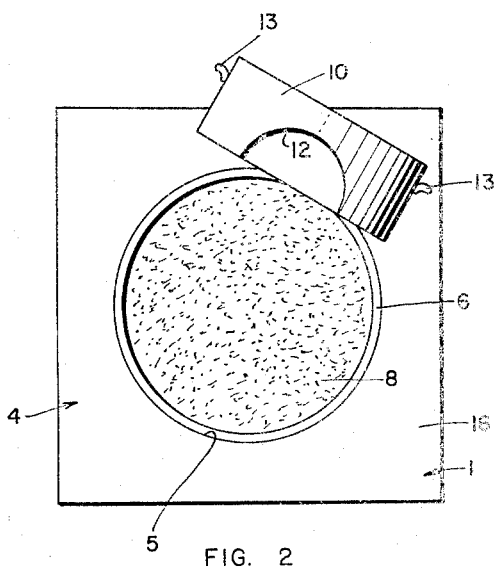
FIGURE 2 is a top plan of the grill.
Figure 3:
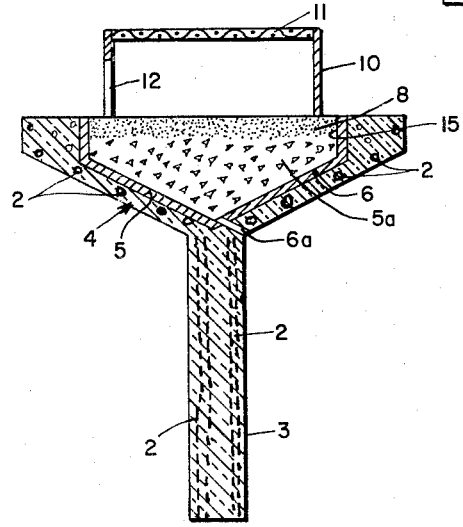
FIGURE 3 is a vertical section taken on the line 3—3 of FIGURE 1.

The main body 4 is rectangular in plan as shown clearly in FIGURE 2 of the drawings and is provided with an inverted conical shaped recess 5 therein which opens out through the upper surface of the main body 4 as clearly shown in FIGS. 2 and 3 of the drawings.

The inner wall of the recess 5 is lined with a layer of fire clay shown at 6 to insulate the concrete of the main body 4 from heat. The major portion of the space within the recess 5 is filled with industrial slag, as shown at 5a (a common well known by-product of metal working) which is heat resisting, insulating and granular in a rather coarse nature. Any water such as rain will drain through the body of industrial slag and out of the bottom of the body 5 through the drain opening 6. This is a particular advantage, as the grill is exposed to the weather at all times and the drain feature prevents accumulation of rain water in the recess 5 in the body 4. Only one drain opening 6 is shown but any desired number may be provided.

The recess 5 is not completely filled with the industrial slag as shown in FIGURE 3 and the space above the upper surface of the filling of slag is filled with sand as shown at 8. In the sand tables or outdoor grills in experimental use at present in Myakka River State Park near Sarasota, Florida, the white sand of the west coast of Florida is used and this provides a clean, substantially white attractive upper surface in the recess 5, which besides its attractive appearance provides the practical functions of a non-porous, -granular, non-inflammable easily removable and replaceable surface and body for receiving the melted grease or fat, or other rejected substances from food cooked upon the table or grill.

Sand is cheap and easily handled and large quantities of it are available at practically all parks and recreation centers, so it is a relatively simple, easy task for a park attendant or other, to "make a round" of the grills or tables, each day or at specified periods, scrape off any soiled or dirty sand from the tables and replace it with fresh sand. Sand may be stored near each table or easily hauled in a small truck as the attendant makes his rounds.

While the white sand of the west coast of Florida is ideal for this use, any sand which is relatively free of clay or other foreign substance, may, of course be used.

The grill proper 10 is cylindrical in shape and may have an outside diameter the same as or approximately the same as the diameter of the circular top of the inverted conical recess 5.

The grill 10 is preferably made of sheet metal, its bottom being open and its top being enclosed by a sheet 11 of foraminous metal of sufficient gauge and strength to support pans, pots or the like, containing food to be cooked, and sufficiently provided with openings to permit the grilling of meat, meat products or other foods directly on the screen. The cylindrical wall of the grill 10 has a draft opening 12 therein, and may have handles 13 thereon if desired.

The grill is attached to the body 1 by a chain 14 of sufficient length to permit ease of handling of the grill and its removal from the top of the table, but prevent its loss or displacement.

If it is so desired the upper part of the inverted conical recess 5 may be made of uniform diameter for a relatively short distance inwardly from the top of the sand table or grill, as clearly shown at 15 in FIGURE 3 of the drawings, thus providing substantially a ledge to determine the depth of the sand layer shown at 8.

The corners 16 of the top of the main body 1 of the sand table, as well as the surface of the table surrounding the opening 5 may be utilized for setting pans, pots, or the like, on the table either before or after they have been placed upon the grill 10.

If it is so desired the main body 1 may be made of lumanite or other suitable material.

What is claimed is:

A sand table or outdoor grill including a substantially hyperbolic paraboloid main body comprising a substantially inverted pyramidal body having its uppermost portion rectangular in shape and of uniform width for a predetermined distance downwardly from its upper face to provide a flat top table section and its sides tapering inwardly and downwardly from said rectangular uppermost portion to the inverted apex of the pyramidal body, a supporting column depending from the inverted apex of the body and being of a maximum diameter considerably less than the width of the body to provide an overhang of the body on all sides of the column, said body and column being formed integrally of a solid moulded concrete construction to eliminate joint crevices, said supporting column being of such length as to permit a portion of its length to be inserted into the ground to support the outdoor grill, said inverted substantially pyramidal body having an inverted conical shaped recess therein opening out through its upper surface and having a maximum diameter portion in the uniform width portion of the body and tapering downwardly therefrom towards the inverted apex of the body, the maximum diameter of said conical shaped recess being less than the width of the uppermost portion of the body to provide a table portion surrounding the uniform diameter portion of the recess, said recess lined with a coating of heat resistant material, said recess filled with a coarse granular heat resisting insulating material to a predetermined distance from the upper surface of the body to permit water to trickle downwardly therethrough, said body provided with a drain opening therein at the lowermost portion of said coarse granular material, the space between the upper surface of the coarse granular material and the upper surface of the body being filled with sand, the upper surface of the sand lying flush with the upper surface of the body, and a removable grill having an open bottom and a foraminous top and a maximum diameter not in excess of the maximum diameter of the inverted conical recess and a depth sufficient to permit building a fire thereunder when the grill is placed upon said sand.

References Cited by the Examiner
UNITED STATES PATENTS

| | | | |
|---|---|---|---|
| D. 131,939 | 4/42 | Robinson | 126—25 X |
| 677,146 | 6/01 | Thurman | 110—3.5 |
| 1,431,696 | 10/22 | Shankland | 126—30 X |
| 2,728,334 | 12/55 | Paolella | 126—25 |
| 2,868,189 | 1/59 | Watrous | 126—25 |
| 3,027,887 | 4/62 | Krohncke | 136—25 |
| 3,033,191 | 5/62 | Bonadiman | 126—25 |

FOREIGN PATENTS 701,720   1/31   France.

FREDERICK L. MATTESON, Jr., *Primary Examiner.*
JAMES W. WESTHAVER, *Examiner.*